United States Patent
Haber

(10) Patent No.: US 7,873,715 B1
(45) Date of Patent: Jan. 18, 2011

(54) OPTIMIZED INSTRUMENTATION OF WEB PAGES FOR PERFORMANCE MANAGEMENT

(75) Inventor: Lior Haber, Modiin (IL)

(73) Assignee: Precise Software Solutions, Inc., Redwood Shores, CA (US)

( * ) Notice: Subject to any disclaimer, the term of this patent is extended or adjusted under 35 U.S.C. 154(b) by 2332 days.

(21) Appl. No.: 10/740,162

(22) Filed: Dec. 18, 2003

(51) Int. Cl.
*G06F 15/173* (2006.01)

(52) U.S. Cl. .................. 709/223; 709/219; 709/224; 707/634

(58) Field of Classification Search .................. 709/219
See application file for complete search history.

(56) References Cited

U.S. PATENT DOCUMENTS

| | | | |
|---|---|---|---|
| 5,450,586 A | 9/1995 | Kuzara et al. | |
| 5,732,218 A * | 3/1998 | Bland et al. | 709/224 |
| 5,996,010 A * | 11/1999 | Leong et al. | 709/223 |
| 6,049,827 A * | 4/2000 | Sugauchi et al. | 709/223 |
| 6,070,190 A * | 5/2000 | Reps et al. | 709/224 |
| 6,081,518 A * | 6/2000 | Bowman-Amuah | 370/352 |
| 6,148,335 A * | 11/2000 | Haggard et al. | 709/224 |
| 6,167,448 A | 12/2000 | Hemphill et al. | |
| 6,317,788 B1 * | 11/2001 | Richardson | 709/224 |
| 6,321,263 B1 * | 11/2001 | Luzzi et al. | 709/224 |
| 6,697,849 B1 * | 2/2004 | Carlson | 709/219 |
| 6,701,363 B1 | 3/2004 | Chiu et al. | |
| 6,760,903 B1 | 7/2004 | Morshed et al. | |
| 6,792,459 B2 | 9/2004 | Elnozahy et al. | |
| 6,826,606 B2 * | 11/2004 | Freeman et al. | 709/223 |
| 6,850,252 B1 * | 2/2005 | Hoffberg | 715/716 |
| 6,857,119 B1 | 2/2005 | Desai | |

OTHER PUBLICATIONS

"Turbo-Charging Dynamic Web Sites with Akamai EdgeSuite," 2001.

* cited by examiner

*Primary Examiner*—Don Wong
*Assistant Examiner*—Tuan-Khanh Phan
(74) *Attorney, Agent, or Firm*—Swernofsky Law Group PC

(57) ABSTRACT

A method and system are provided for optimized instrumentation of web pages in a performance management system. A web server receives a request for a web page from a web client. A callout to a performance management agent is inserted into the requested web page. The web page, including the callout to the agent, is sent to the web client. The web client may use the callout to load the agent by sending a request for the agent to a collector server. The agent may collect performance metrics on the web client and send the performance metrics to the collector server for storage and/or analysis.

3 Claims, 11 Drawing Sheets

OPTIMIZED INSTRUMENTATION OF WEB PAGES FOR PERFORMANCE MANAGEMENT

BACKGROUND OF THE INVENTION

1. Field of the Invention

This invention is related to the field of application performance management and, more particularly, to the instrumentation of web pages for collecting performance metrics.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users.

Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

SUMMARY OF THE INVENTION

Various embodiments of a system and method described herein may provide optimized instrumentation of web pages in a performance management system. In one embodiment, a method of performance management for web browsing comprises a web server receiving a request for a web page from a web client. A callout to a performance management agent is inserted into the requested web page. The web page, including the callout to the agent, is sent to the web client. The web client may use the callout to load the agent by sending a request for the agent to a collector server. The agent may collect to performance metrics on the web client and send the performance metrics to the collector server for storage and/or analysis.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

A performance management system may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAPS; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

Figure 1:
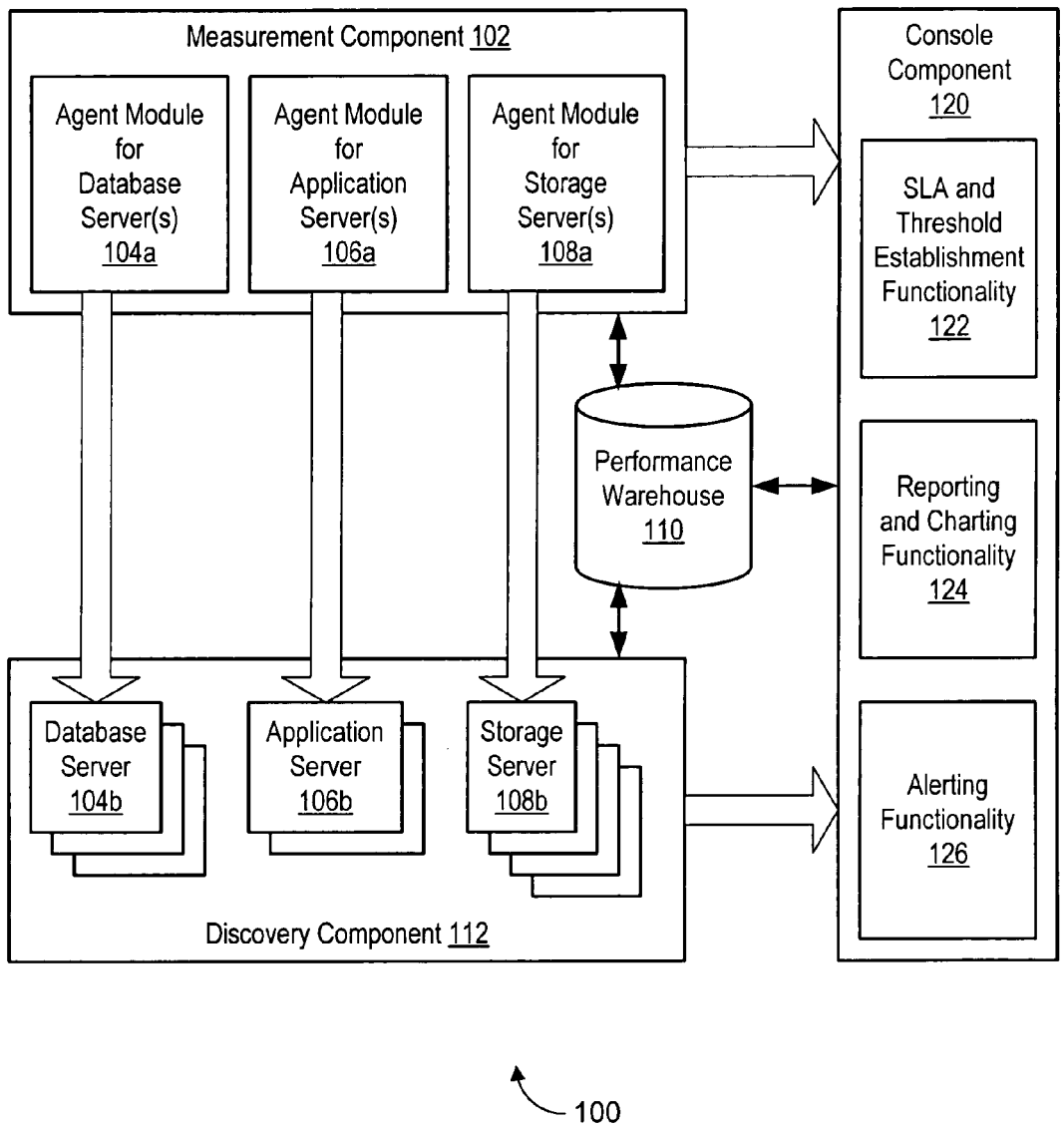
FIG. 1 illustrates an exemplary performance management system in which embodiments of a system and method for performance management may be implemented.
Figure 2:
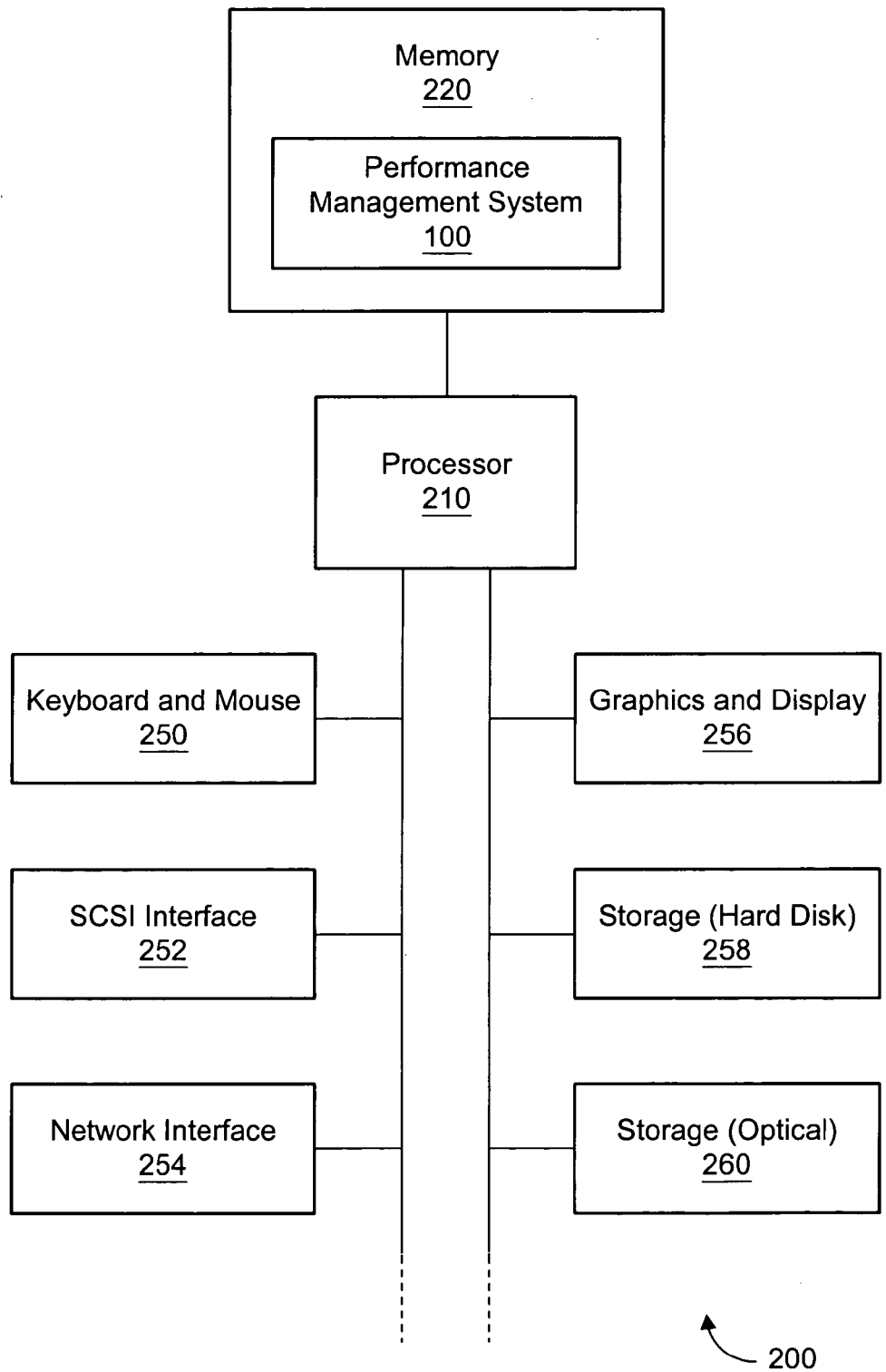
FIG. 2 illustrates components of an exemplary computer system with which embodiments of a system and method for performance management may be implemented.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail.

The performance management system 100 of FIG. 1 may be executed by one or more networked computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. For example, the instructions may include instructions for the performance management system 100. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by a communications bus 207. The network interface 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

Figure 3:
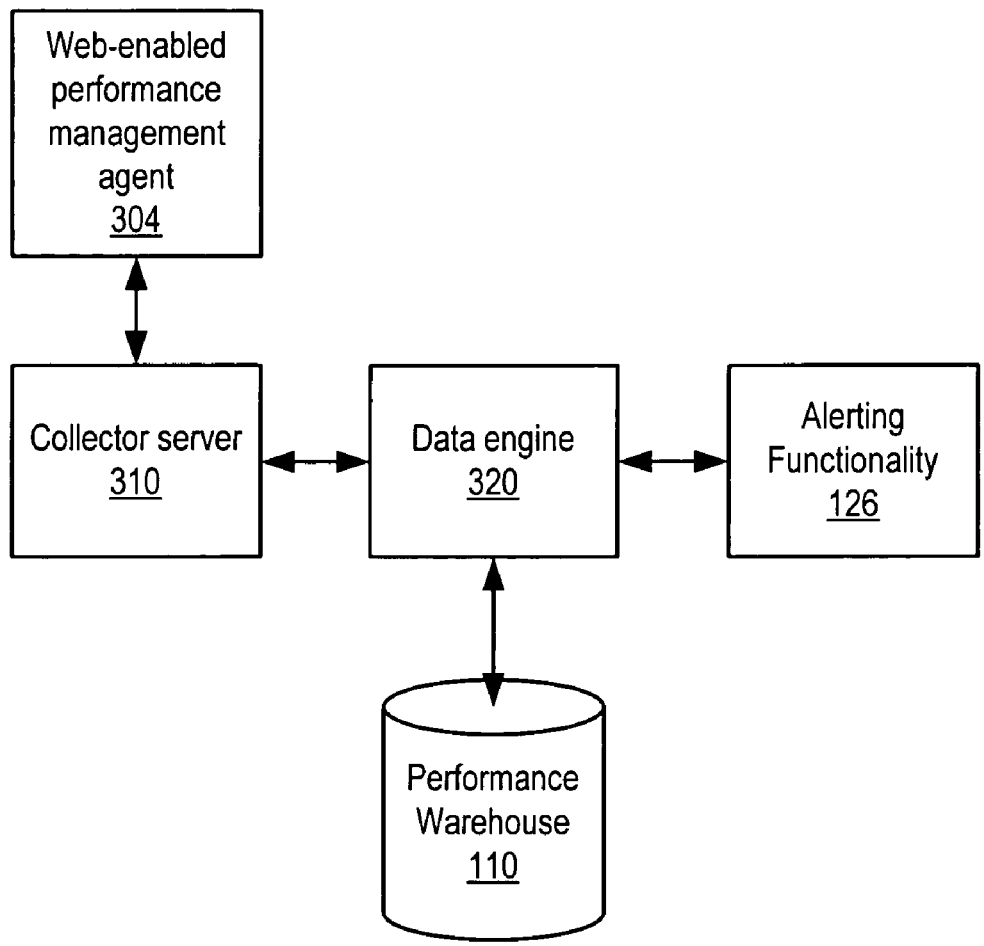
FIG. 3 illustrates components of an agent-based performance management system according to one embodiment.
Figure 4:
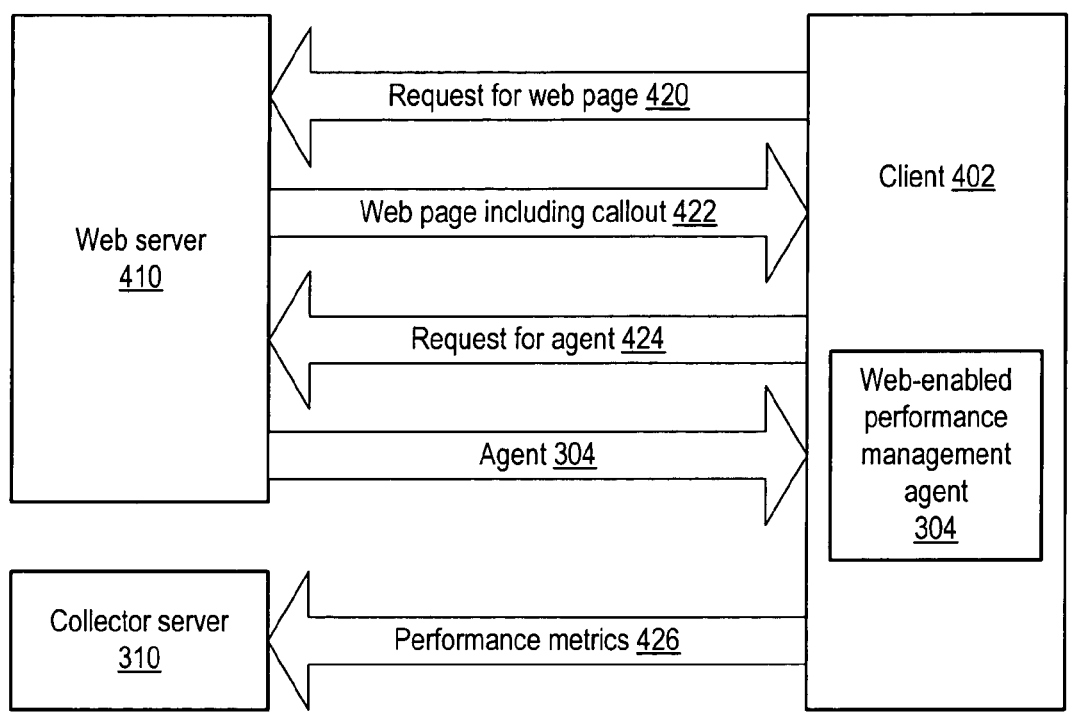
FIG. 4 illustrates components of an agent-based system for managing the performance of a web browser or web-enabled application according to one embodiment.

FIGS. 3 and 4 illustrate components of an agent-based performance management system according to one embodiment. A web-enabled performance management agent (also referred to herein as an "agent") 304 may collect performance metrics 426 on a client computer system 402. In one embodiment, the agent 304 may send the collected metrics 426 to a collector server 310 at appropriate intervals. As illustrated in FIG. 3, the collector server 310 may communicate with a data engine 320 which is operable to process or analyze the collected metrics (as discussed further with reference to FIG. 1). The data engine 320 may store the metrics in the performance warehouse 110. Upon processing the metrics, the data engine 320 may use the alerting functionality 126 to indicate performance problems.

The agent 304 may comprise software which is executable on the client computer system 402. In one embodiment, the agent may comprise instructions which are expressed in a scripting language (e.g., an applet). The instructions may be executable by a web client 402 which is configured to interpret and/or execute the scripting language used for the agent 304. The web client 402 may comprise a web browser or other web-enabled application that is operable to exchange data with a web server 410.

The metrics 426 collected by the agent 304 may include measurements of web-related performance between the web client 402 and a web server 410. For example, the metrics 426 may include transmission times or response times for data sent between the web client 402 and web server 410. In particular, the metrics 426 may include the first byte time, i.e., the time it takes for the client request for a new web page until the web page source (e.g., the HTML document) arrives at the client from the web server 410. The metrics 426 may include the rendering time, i.e., the time it takes from receiving the web page source until all the content of the page (e.g., images and other additional content in the page) is completely downloaded by the client 402. The metrics 426 may include the overall wait time, which comprises both the first byte time and the rendering time. The metrics 426 may include the page views, i.e., the number of times a particular web page was requested. The metrics 426 may include an abandonment ratio, i.e., a ratio of times the user left the web page before it was completely rendered or displayed. The metrics 426 may include an SLA compliance ratio, i.e., a ratio of requests falling within defined SLA thresholds. By "drilling down" into the metrics 426, performance problems may be correlated to particular web pages, particular types of web transactions, particular geographical locations, particular logical domains, particular connection types (e.g., LAN or dial-up), particular file types (e.g., .html or .asp), or particular protocols (e.g., HTTP or HTTPS).

Figure 5:
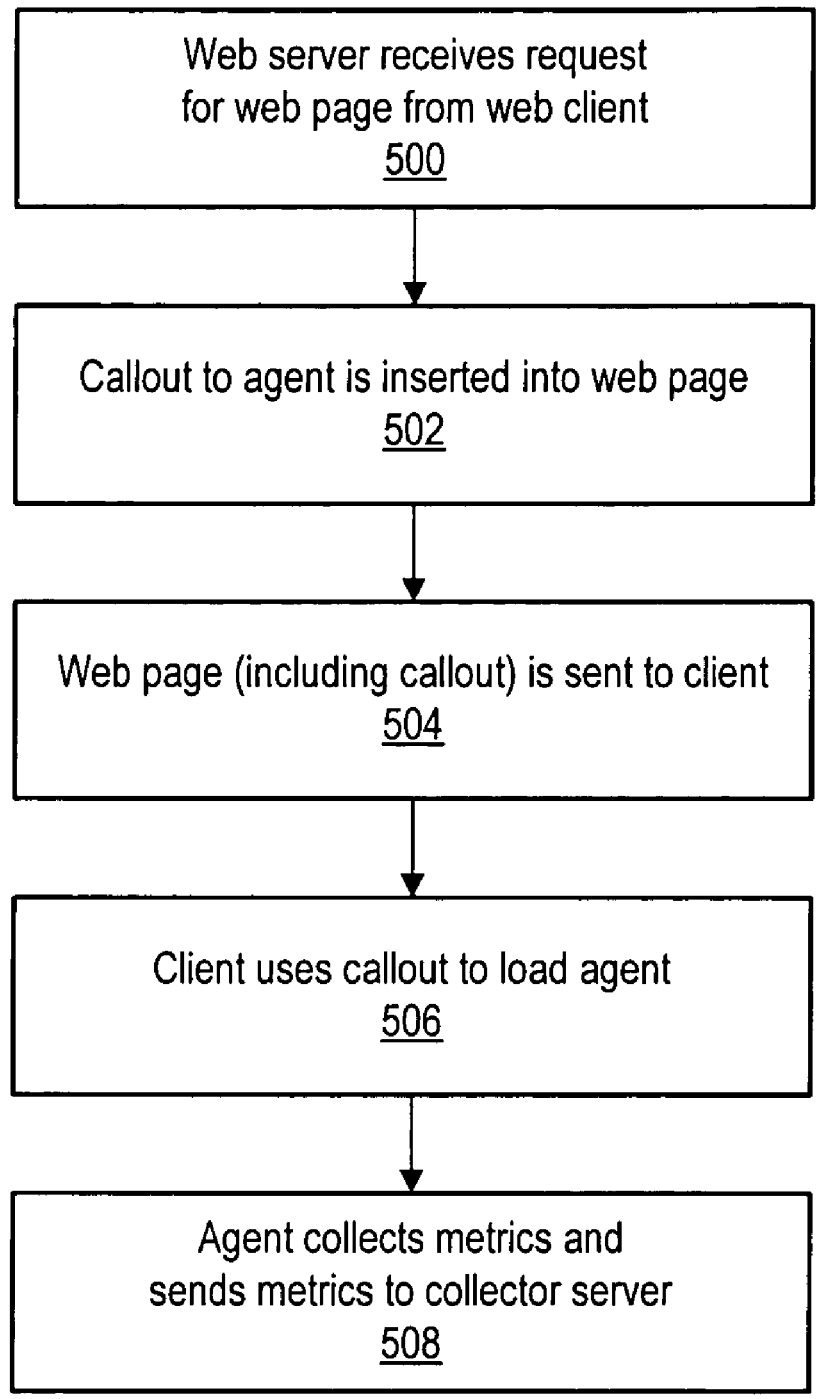
FIG. 5 is a flowchart which illustrates a method of performance management for web browsing according to one embodiment.

FIG. 5 is a flowchart which illustrates a method of performance management for web browsing according to one embodiment. A web server 410 receives a request 420 for a web page from a web client 402 in 500. A callout to a performance management agent 304 is inserted into the requested web page in 502. As used herein, the term "callout" may include callouts, function calls, and other commands which are usable to invoke or retrieve the performance management agent 304. The web page 422, including the callout to the agent 304, is sent to the web client 402 in 504. In 506 the web client 402 uses the callout to load the agent 304 by sending a request 424 for the agent 304 to the server 410. The agent 304 may be retrieved during the rendering of the web page. In 508 the agent 304 collects performance metrics 426 and sends the metrics to the collector server 310.

Figure 6:
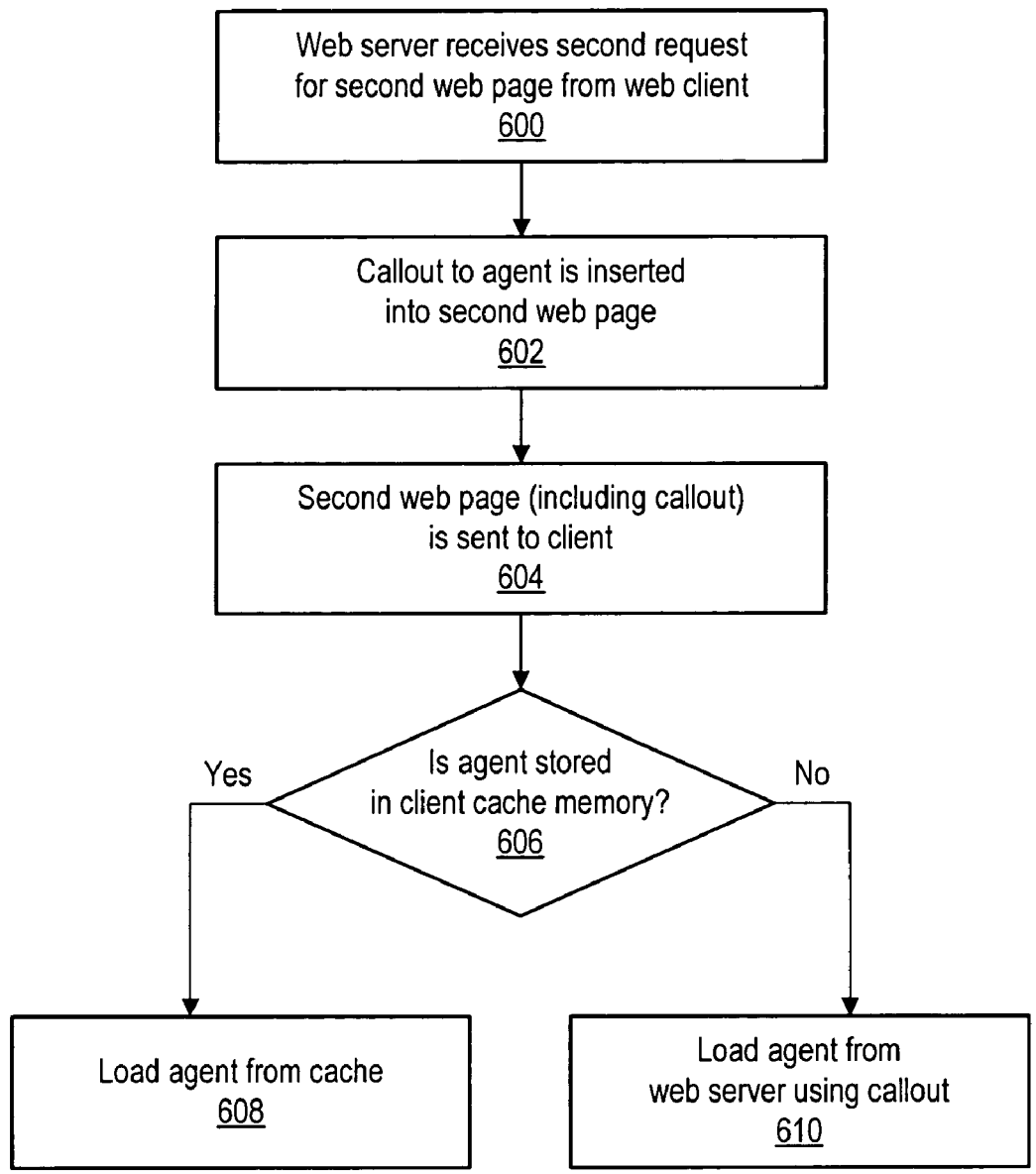
FIG. 6 is a flowchart which illustrates a method of performance management for web browsing using a cached performance agent according to one embodiment.

In one embodiment, the callout to the agent is substantially smaller in size than the agent itself. By embedding the callout to an agent rather than the agent itself into web pages, the overhead of using the agent may be reduced. Instead of loading the agent 304 with each and every web page requested from the server 410, the client 402 may load the agent 304 once and store the agent 304 in a cache. FIG. 6 is a flowchart which illustrates a method of performance management for web browsing using a cached performance agent 304 according to one embodiment. A web server 410 receives a second request for a second web page from a web client 402 in 600. A callout to the performance management agent 304 is inserted into the second requested web page in 602. The second web page, including the callout to the agent 304, is sent to the web client 402 in 604. In 606 it is determined whether the agent 304 is stored in a cache memory at the web client 402 (e.g., in the cache memory of a web browser). If the agent 304 is already stored in the client's cache memory, then the agent 304 may be loaded from the cache in 608. If the agent 304 is not stored in the client's cache memory, then the web client 402 uses the callout to load the agent from the collector server in 610. As discussed with reference to FIGS. 3-5, the agent 304 may collect performance metrics 426 and send the metrics 426 to the collector server 310.

The use of the callout to the agent may also improve the modularity of the performance management system. Periodically, the agent 304 may be updated. Instead of updating every web page on the web server 410 with a new version of the agent 304, the agent may be updated only on the collector server 310. The callout in the web pages is usable to fetch the latest version of the agent 304 from the collector server 310. In one embodiment, loading the agent 304 at the client 402 may therefore comprise automatically updating the agent 304 at the client 402.

FIGS. 7A-7D are flowcharts which illustrate methods of performance management for web-enabled applications according to one embodiment. The web-enabled applications may include client applications for various systems from SAP® (e.g., SAP® In-Q-My™); CRM (Customer Relationship Management) systems from PeopleSoft, Inc.; various systems from Siebel Systems, Inc.; and other suitable systems. As illustrated in 702 of FIG. 7A, a server 410 receives a request for a web page from a client 402. The web page, including the callout to a performance management agent 304, is sent to the client in 706. During the rendering of the web page, the client 402 uses the callout to load the agent 304 in 710. In 712 the agent 304 collects performance metrics 426 and sends the metrics 426 to the collector server 310.

Figure 7A:
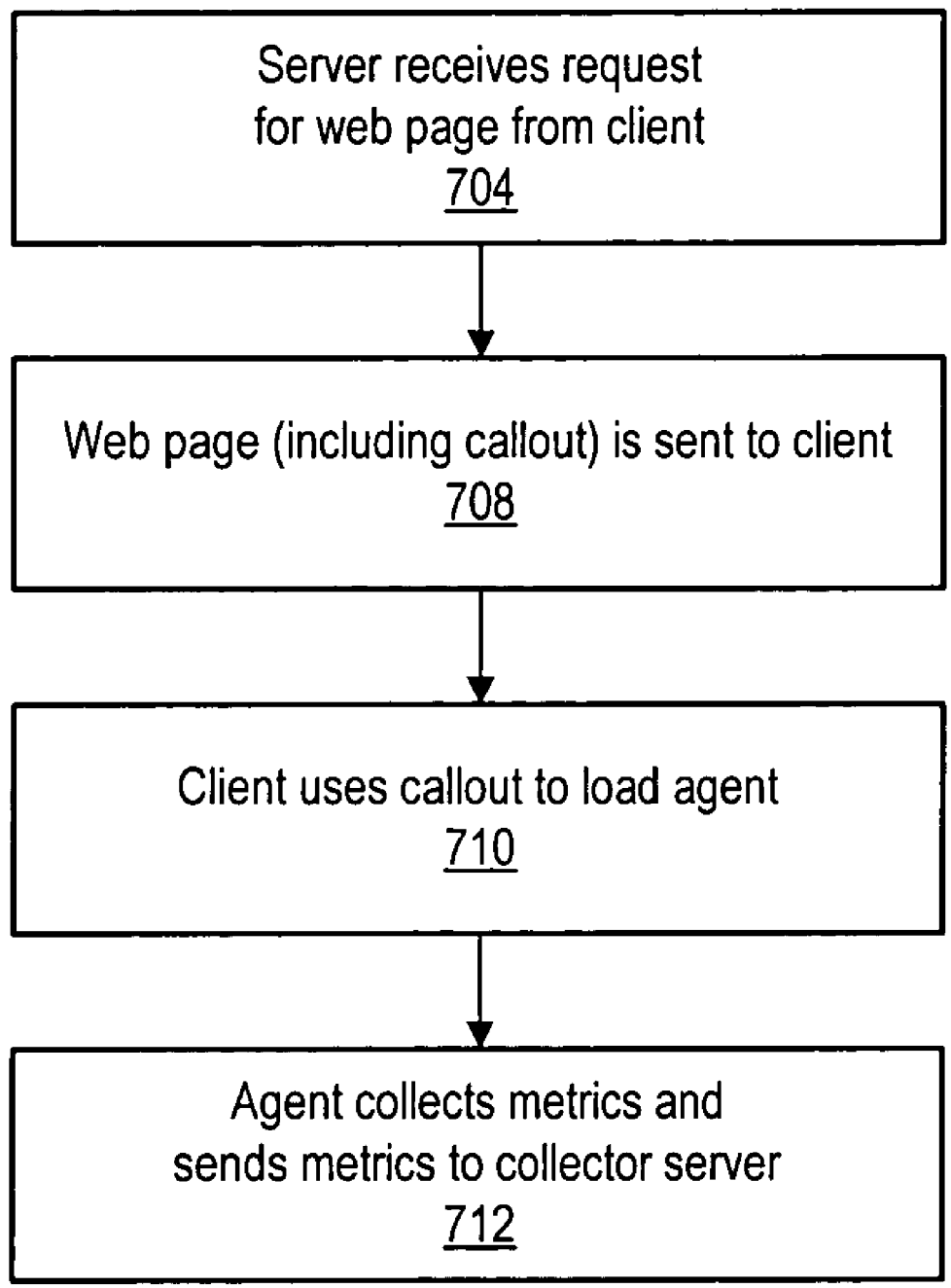
FIGS. 7A through 7D are flowcharts which illustrate methods of performance management for web-enabled applications according to one embodiment.
Figure 7B:
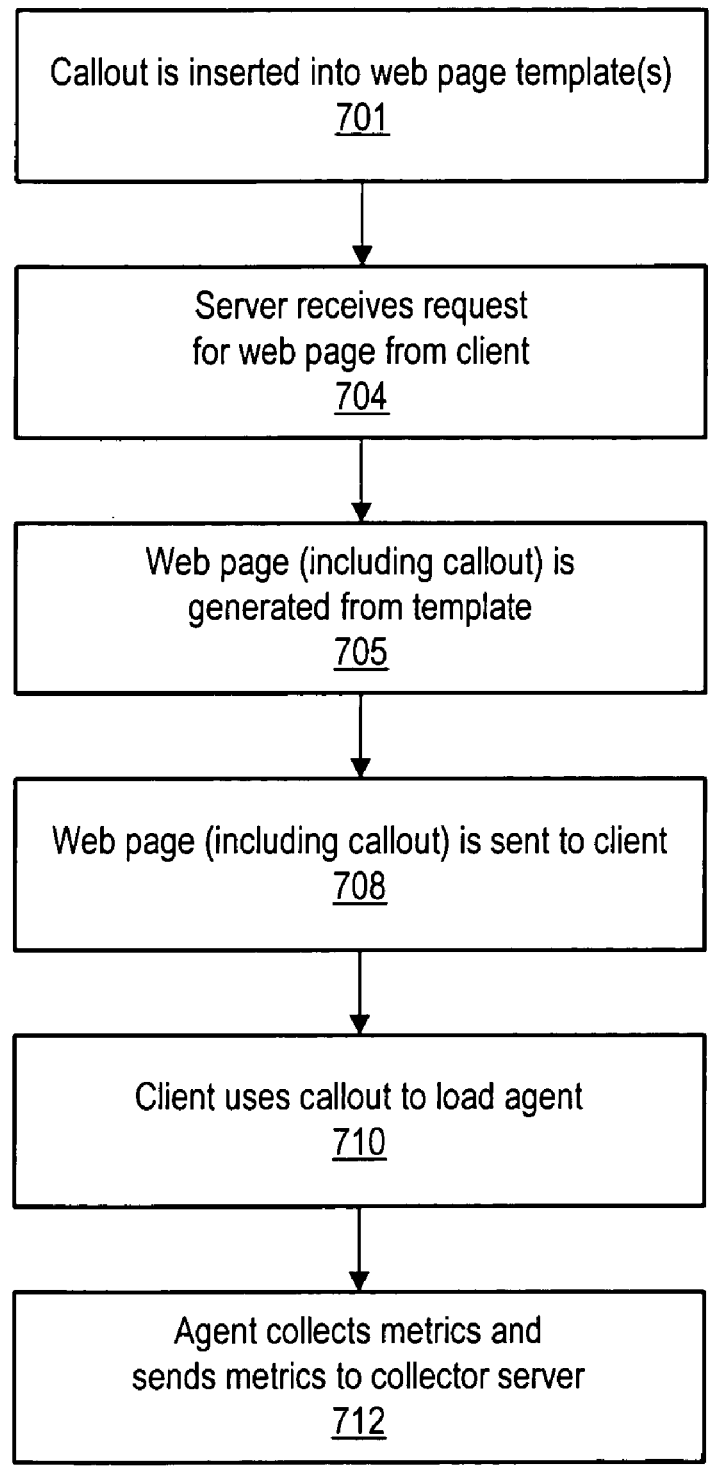
Figure 7C:
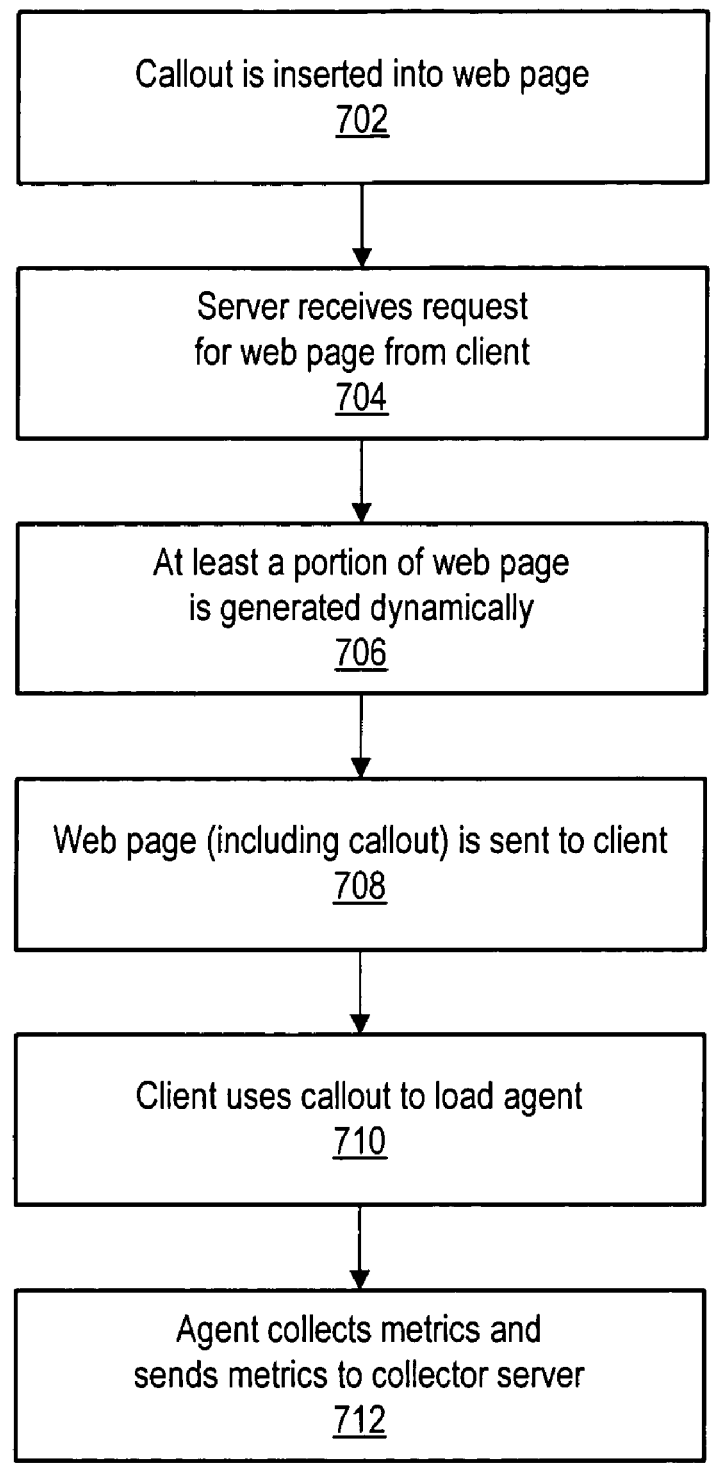
Figure 7D:
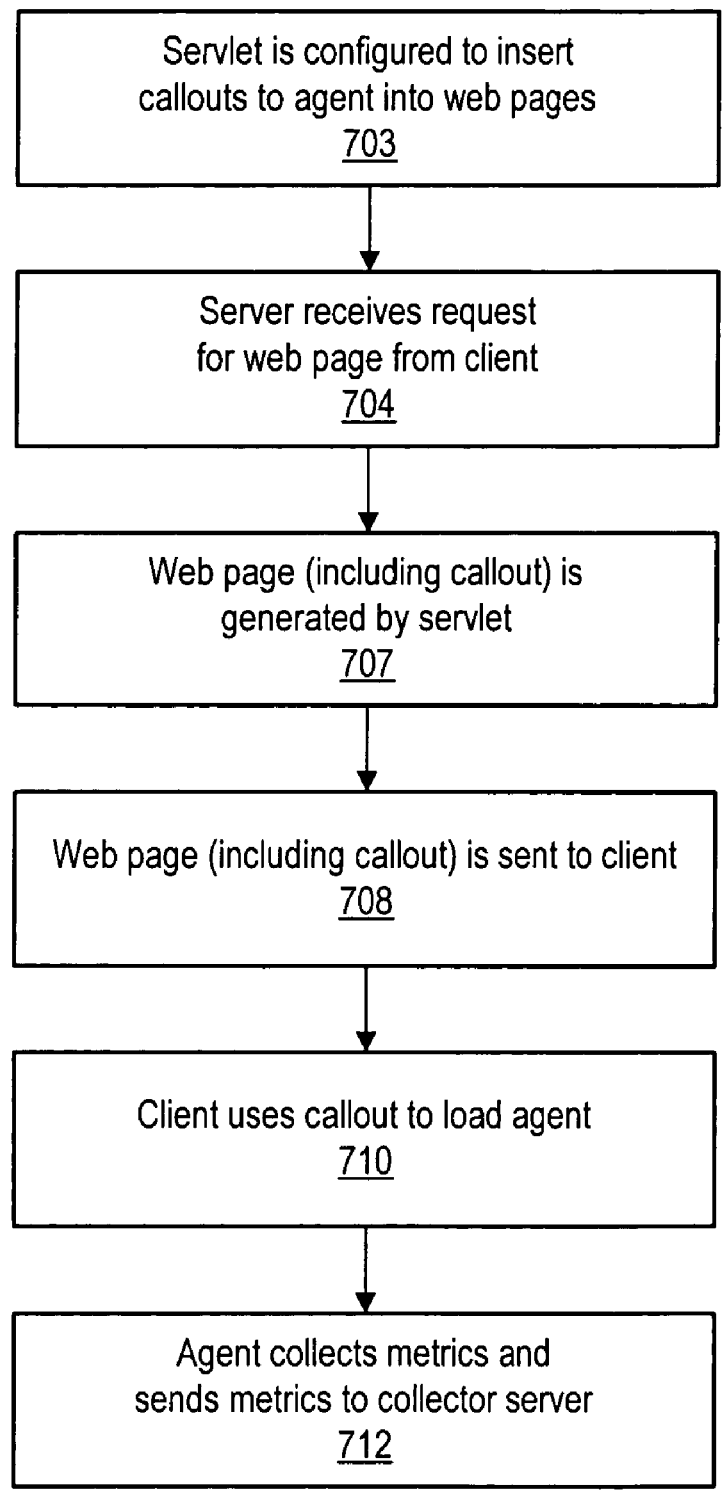

FIGS. 7B-7D further illustrate methods of inserting the callout to the agent 304 into the web pages. The methods illustrated in FIGS. 7B-7D may be used to instrument various web-enabled client/server systems in an efficient manner. The methods illustrated in FIGS. 7B-7D may be used to instrument web pages that are not standard .html files. The methods illustrated in FIGS. 7B-7D are provided by way of example, and other methods of inserting callouts into web pages may be suitable for use with the method illustrated in FIG. 7A.

FIG. 7B illustrates a method of performance management for web-enabled applications which use web-page templates according to one embodiment. The method illustrated in FIG. 7B may be used, for example, with various systems from Siebel Systems, Inc., and other suitable systems. The callout to the agent 304 may be inserted into one or more templates in 701, prior to receiving the request for the web page in 704. The templates may comprise partially completed web pages with "blanks" to be completed with additional data during generation of the page. After the request in 704, the requested web page may be generated from the one or more templates in 705 such that the web page includes the callout to the agent 304. For example, a template for listing an organization's employees may comprise blanks for employee information. Upon receiving a client request for an employee list, the web server 410 may retrieve the employee information from a database and use the employee information to complete the template. The generated web page may be sent to the client in 708 and rendered by a web browser or other web-enabled client application.

FIG. 7C illustrates a method of performance management for web-enabled applications which use dynamically generated web pages according to one embodiment. The method illustrated in FIG. 7C may be used, for example, with various systems from SAP® (e.g., SAP® In-Q-My™) and other suitable systems. The callout may be inserted into a web page in 702. The requested web page may comprise a static portion and a dynamically generated portion. For example, the dynamically generated portion of the requested web page may comprise instructions expressed in a scripting language (e.g., JavaScript™), and the web page may comprise a static HTML portion and a dynamic JSP portion. The instructions may be performed by the web server 410 to generate the web page in 706. In various embodiments, the callout to the agent may be comprised within the dynamically generated portion of the web page or within the static portion of the web page. The dynamically generated web page may be sent to the client in 708 and rendered by a web browser or other web-enabled client application.

FIG. 7D illustrates a method of performance management for web-enabled applications which use servlets to generate web pages dynamically according to one embodiment. The method illustrated in FIG. 7D may be used, for example, with CRM (Customer Relationship Management) systems from PeopleSoft, Inc., and other suitable systems. As used herein, a "servlet" is a web-enabled program that runs within a server. Typically, a servlet is a persistent program that is configured to process a plurality of requests for web pages. The servlet may be configured to insert callouts into web pages in 703. In one embodiment, the configuration process may include modifying the program code of the servlet. After a request for a web page is received by the server in 704, the servlet may generate the requested web page in 707. In generating the web page, the servlet may insert the callout to the agent 304 into the web page. In one embodiment, the servlet may generate the web page dynamically. The dynamically generated web page may be sent to the client in 708 and rendered by a web browser or other web-enabled client application.

Figure 8:
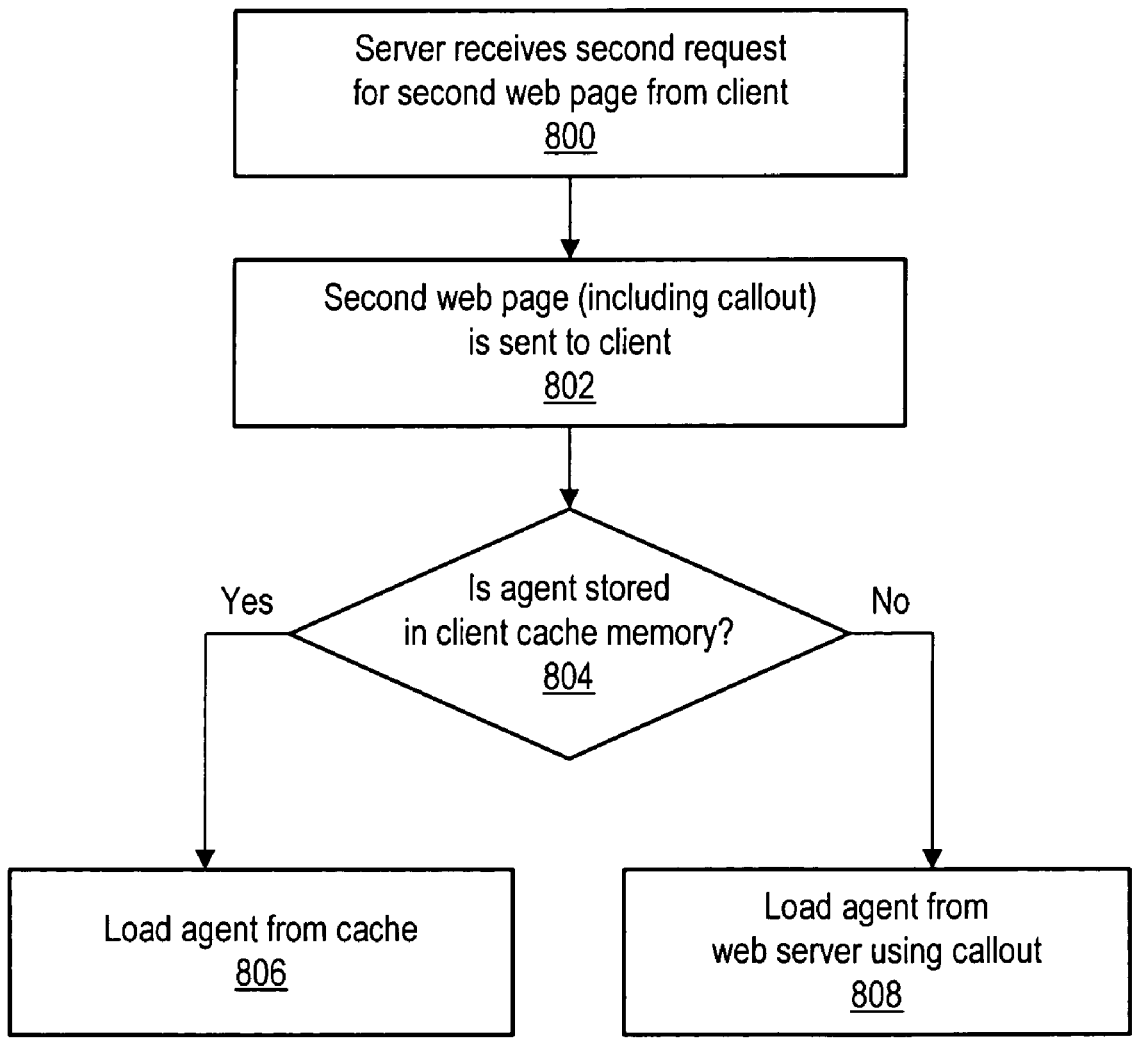
FIG. 8 is a flowchart which illustrates a method of performance management for web-enabled applications using a cached performance agent according to one embodiment.

FIG. 8 is a flowchart which illustrates a method of performance management for web-enabled applications using a cached performance agent 304 according to one embodiment. A server 410 receives a second request for a second web page from a client 402 in 800. The second web page, including the callout to the agent 304, is sent to the client 402 in 802. In 804 it is determined whether the agent 304 is stored in a cache memory at the client 402 (e.g., in the cache memory of a web-enabled application configured to access the server 410). If the agent 304 is already stored in the client's cache memory, then the agent 304 may be loaded from the cache in 806. If the agent 304 is not stored in the client's cache memory, then the client 402 uses the callout to load the agent 304 from the collector server in 808. As discussed with reference to FIGS. 7A-7D, the agent 304 may collect performance metrics 426 and send the metrics 426 to a collector server 310.

It is further noted that any of the embodiments described above may further include receiving, sending or storing instructions and/or data that implement the operations described above in conjunction with FIGS. 1-8 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
  receiving a request for a web page at a web server, wherein the request issues from a web client;
  inserting a callout to a performance management agent into the requested web page, wherein the callout comprises an invocation of the performance management agent;
  sending the requested web page from the web server to the web client;
  loading the performance management agent at the web client using the callout in the requested web page;
  receiving a second request for a second web page at the web server, wherein the second request issues from the web client;
  inserting the callout to the performance management agent into the requested second web page;
  sending the requested second web page from the web server to the web client;
  determining whether the performance management agent resides in a cache memory at the web client;
  if the performance management agent resides in the cache memory, loading the performance management agent from the cache memory; and
  if the performance management agent does not reside in the cache memory, using the callout to load the performance management agent via a network.

2. A computer-readable storage medium comprising program instructions, wherein the program instructions are computer-executable to implement:
  receiving a request for a web page at a web server, wherein the request issues from a web client;
  inserting a callout to a performance management agent into the requested web page, wherein the callout comprises an invocation of the performance management agent;
  sending the requested web page from the web server to the web client;
  loading the performance management agent at the web client using the callout in the requested web page;
  receiving a second request for a second web page at the web server, wherein the second request issues from the web client;
  inserting the callout to the performance management agent into the requested second web page;
  sending the requested second web page from the web server to the web client;
  determining whether the performance management agent resides in a cache memory at the web client;
  if the performance management agent resides in the cache memory, loading the performance management agent from the cache memory; and
  if the performance management agent does not reside in the cache memory, using the callout to load the performance management agent via a network.

3. A system comprising:
  a web server;

a performance management agent which is configured to collect performance metrics at a web client, wherein the web client is coupled to the web server via a network;
wherein the web server is operable to;
　　receive a request for a web page from the web client;
　　insert a callout to the performance management agent into the requested web page, wherein the callout comprises an invocation of the performance management agent;
　　send the requested web page to the web client;
　　receive a second request for a second web page from the web client;
　　insert the callout to the performance management agent into the requested second web page; and
　　send the requested second web page to the web client;
wherein the web client is operable to:
　　determine whether the performance management agent resides in a cache memory at the web client;
　　if the performance management agent resides in the cache memory, load the performance management agent from the cache memory;
　　if the performance management agent does not reside in the cache memory, use the callout to load the performance management agent from the web server
　　load the performance management agent using the callout in the requested web page.

* * * * *